US009438732B2

(12) United States Patent
Skiba et al.

(10) Patent No.: US 9,438,732 B2
(45) Date of Patent: *Sep. 6, 2016

(54) CROSS-LINGUAL SEEDING OF SENTIMENT

(71) Applicant: Avaya Inc., Basking Ridge, NJ (US)

(72) Inventors: David Skiba, Golden, CO (US);
George W. Erhart, Loveland, CO (US); Lee Becker, Boulder, CO (US);
Valentine C. Matula, Granville, OH (US)

(73) Assignee: Avaya Inc., Basking Ridge, NJ (US)

( * ) Notice: Subject to any disclaimer, the term of this patent is extended or adjusted under 35 U.S.C. 154(b) by 281 days.

This patent is subject to a terminal disclaimer.

(21) Appl. No.: 14/021,889

(22) Filed: Sep. 9, 2013

(65) Prior Publication Data

US 2014/0303981 A1    Oct. 9, 2014

Related U.S. Application Data

(60) Provisional application No. 61/809,737, filed on Apr. 8, 2013.

(51) Int. Cl.
| | | |
|---|---|---|
| *G10L 21/00* | (2013.01) | |
| *H04M 3/51* | (2006.01) | |
| *G06F 17/28* | (2006.01) | |
| *G06Q 50/00* | (2012.01) | |
| *G10L 15/18* | (2013.01) | |
| *H04L 12/58* | (2006.01) | |
| *G06F 17/27* | (2006.01) | |

(52) U.S. Cl.
CPC ............ *H04M 3/5175* (2013.01); *G06F 17/27* (2013.01); *G06F 17/28* (2013.01); *G06Q 50/01* (2013.01); *G10L 15/1822* (2013.01); *H04L 51/046* (2013.01); *H04L 51/32* (2013.01); *G10L 15/18* (2013.01)

(58) Field of Classification Search
USPC ................................................ 704/270, 7–10
See application file for complete search history.

(56) References Cited

U.S. PATENT DOCUMENTS

| | | |
|---|---|---|
| 6,879,668 B2 | 4/2005 | Neuwald et al. |
| 7,903,801 B1 | 3/2011 | Ruckart |
| 7,912,720 B1 | 3/2011 | Hakkani-Tur et al. |
| 7,983,910 B2 | 7/2011 | Subramanian et al. |
| 7,996,210 B2 | 8/2011 | Godbole et al. |
| 8,010,539 B2 | 8/2011 | Blair-Goldensohn et al. |
| 8,111,813 B2 | 2/2012 | Weber et al. |
| 8,352,405 B2 | 1/2013 | Fang et al. |

(Continued)

OTHER PUBLICATIONS

U.S. Appl. No. 13/594,283, filed Aug. 24, 2012, entitled: Real Time Statistics for Contact Center Mood Analysis Method and Apparatus.

(Continued)

*Primary Examiner* — Leonard Saint Cyr
(74) *Attorney, Agent, or Firm* — Sheridan Ross P.C.

(57) ABSTRACT

A contact center system can receive messages from social media sites or centers. The messages may be in a foreign language. The system can review messages by identifying content in the social media messages with negative/positive sentiment and then identify a seed term in the messages. A seed term can be a word in another language, different from the message body. The seed term is then used to find one or more other words, in the foreign language, that are correlated with the seed term. The identification of the found words in other messages can then be used to determine sentiment in the foreign language.

20 Claims, 10 Drawing Sheets

(56) References Cited

U.S. PATENT DOCUMENTS

| | | | |
|---|---|---|---|
| 8,463,594 | B2 | 6/2013 | Au |
| 8,463,606 | B2 | 6/2013 | Scott et al. |
| 8,700,480 | B1 | 4/2014 | Fox et al. |
| 8,838,633 | B2 * | 9/2014 | Dhillon et al. ............... 707/758 |
| 8,862,577 | B2 * | 10/2014 | Hao et al. ...................... 707/723 |
| 8,972,379 | B1 | 3/2015 | Grieselhuber et al. |
| 2005/0125216 | A1 | 6/2005 | Chitrapura et al. |
| 2007/0064882 | A1 | 3/2007 | Ger et al. |
| 2008/0270116 | A1 * | 10/2008 | Godbole ............... G06F 17/279 704/9 |
| 2009/0306967 | A1 | 12/2009 | Nicolov et al. |
| 2009/0319342 | A1 | 12/2009 | Shilman et al. |
| 2010/0050117 | A1 | 2/2010 | Sherrard et al. |
| 2010/0119053 | A1 | 5/2010 | Goeldi |
| 2010/0312769 | A1 * | 12/2010 | Bailey ............... G06F 17/30705 707/740 |
| 2011/0002451 | A1 | 1/2011 | Moran et al. |
| 2011/0013756 | A1 | 1/2011 | Davies et al. |
| 2011/0078167 | A1 | 3/2011 | Sundaresan et al. |
| 2011/0191693 | A1 * | 8/2011 | Baggett ................. G06Q 10/107 715/752 |
| 2011/0207437 | A1 | 8/2011 | Richardson et al. |
| 2012/0046938 | A1 * | 2/2012 | Godbole ............... G06F 17/279 704/9 |
| 2012/0143683 | A1 | 6/2012 | Hertz et al. |
| 2012/0245925 | A1 | 9/2012 | Guha et al. |
| 2012/0246104 | A1 | 9/2012 | Di Sciullo et al. |
| 2012/0259616 | A1 | 10/2012 | Peng et al. |
| 2012/0278064 | A1 | 11/2012 | Leary et al. |
| 2012/0296845 | A1 | 11/2012 | Andrews et al. |
| 2013/0046756 | A1 * | 2/2013 | Hao et al. ...................... 707/723 |
| 2013/0103386 | A1 | 4/2013 | Zhang et al. |
| 2013/0103623 | A1 * | 4/2013 | Burstein et al. ................. 706/12 |
| 2013/0124191 | A1 | 5/2013 | Louis et al. |
| 2013/0173254 | A1 | 7/2013 | Alemi |
| 2013/0204613 | A1 * | 8/2013 | Godbole ................. G06F 17/21 704/9 |
| 2013/0218640 | A1 | 8/2013 | Kidder et al. |
| 2013/0231975 | A1 | 9/2013 | High et al. |
| 2013/0311485 | A1 * | 11/2013 | Khan ........................... 707/748 |
| 2013/0325877 | A1 | 12/2013 | Niazi |
| 2014/0019118 | A1 | 1/2014 | Tromp |
| 2014/0095148 | A1 | 4/2014 | Berjikly et al. |
| 2014/0180788 | A1 | 6/2014 | George et al. |
| 2014/0189536 | A1 | 7/2014 | Lange et al. |
| 2014/0237057 | A1 | 8/2014 | Khodorenko |
| 2014/0282934 | A1 | 9/2014 | Miasnik et al. |
| 2014/0304264 | A1 | 10/2014 | Hailpern et al. |
| 2014/0304343 | A1 | 10/2014 | Skiba et al. |
| 2014/0365213 | A1 | 12/2014 | Totzke |
| 2015/0106155 | A1 | 4/2015 | Castellanos et al. |
| 2015/0189084 | A1 | 7/2015 | Mohler |

OTHER PUBLICATIONS

U.S. Appl. No. 14/024,334, filed Sep. 11, 2013, entitled: Unspoken Sentiment.

U.S. Appl. No. 14/023,967, filed Sep. 16, 2013, entitled: Automatic Domain Sentiment Expansion.

U.S. Appl. No. 14/020,674, filed Sep. 6, 2013, entitled: Automatic Negative Question Handling.

Blair-Goldensohn et al., "Building a Sentiment Summarizer for Local Service Reviews," WWW Workshop on NLP in the Information Explosion Era, 2008, vol. 14, 10 pages.

Glance et al., "BlogPulse: Automated Trend Discovery for Weblogs," WWW Workshop on the Weblogging Ecosystem: Aggregation, Analysis and Dynamics, 2004, New York, 8 pages.

Neviarouskaya et al., "Textual Affect Sensing for Sociable and Expressive Online Communication," ACII 2007, LNCS 4738, 2007 Springer-Verlag, pp. 218-229.

Reyes et al., "A multidimensional approach for detecting irony in Twitter," Lang Resources & Evaluation, 2013, vol. 47, pp. 239-268.

Zhe et al., "Text-to-Emotion Engine for Real Time Internet Communication," Networks and DSPs, 2002, pp. 164-168.

Official Action for U.S. Appl. No. 13/594,283, mailed Dec. 3, 2015 21 pages.

Official Action for U.S. Appl. No. 14/020,674, mailed Dec. 3, 2015 22 pages.

Official Action for U.S. Appl. No. 14/024,334, mailed Nov. 10, 2015 17 pages.

"Contact Center Text Analytics," Verint, Inc., 2012, 1 page [retrieved from: http://verint.com/contact_center/section2a.cfm?article_level2_category_id=21&article_level2a_id=345].

"Avaya Delivers Social Media Solutions to Drive Superior Customer Experiences," AVAYA, Jul. 2011, 1 page [retrieved from: http://www.avaya.com/usa/about-avaya/newsroom/news-releases/2011/pr-110712a].

"Verint Extends Customer Interaction Analytics Portfolio with Addition of Sentiment and Text Analytics Software," Verint System Inc., Sep. 29, 2010, 3 pages [http://www.verint.com/news-events/press-releases/2010-pr-archives/09_29_2010.html].

Devillers et al. "Annotation and Detection of Emotion in a Task-oriented Human-Human Dialog Corpus," ISLE workshop, Dec. 2002, 10 pages.

Meng et al. "Cross-Lingual Mixture Model for Sentiment Classification," Proceedings of the 50th Annual Meeting of the Association for Computational Linguistics, Jeju, Republic of Korea, Jul. 8-14, 2012, pp. 572-581.

Official Action for U.S. Appl. No. 13/594,283, mailed Sep. 12, 2014 5 pages.

Official Action for U.S. Appl. No. 13/594,283, mailed Feb. 9, 2015 8 pages.

Official Action for U.S. Appl. No. 13/594,283, mailed Apr. 28, 2015 13 pages.

Official Action for U.S. Appl. No. 13/594,283, mailed Jun. 29, 2015 16 pages.

Official Action for U.S. Appl. No. 14/024,334, mailed Jul. 8, 2015 3 pages.

Official Action for U.S. Appl. No. 14/020,674, mailed Jan. 20, 2016 15 pages.

* cited by examiner

CROSS-LINGUAL SEEDING OF SENTIMENT

RELATED APPLICATIONS

This application claims priority to U.S. Provisional Application 61/809,737, filed Apr. 8, 2013, entitled "SENTIMENT FOR USE IN CONNECTION WITH CONTACT CENTER COMMUNICATIONS," which is incorporated herein by reference for all that it teaches and for all purposes.

BACKGROUND

Communication with customers and the importance of addressing customer concerns continues to grow in importance. Sentiment is generally regarded as an opinion or attitude towards something or someone or the expression of the opinion or attitude. With written, global communications on the rise, companies are developing methods and systems to determine sentiment when communications include information about the company. It may be critically important for reputation and branding to be able to respond quickly to expressed written sentiment (especially if it is negative).

Current methods of determining sentiment are either ineffective or inefficient, especially when analyzing messages in different languages. For example, emoticons are often used but may be culturally ambiguous and are not good indicators especially in a noisy environment. The company needs an efficient way to determine that a message, even in a foreign language, is negative and requires agent attention.

SUMMARY

It is with respect to the above issues and other problems that the embodiments presented herein were contemplated. Embodiments include a method for determining sentiment in a foreign language, the method comprising: retrieving one or more sentiment terms with known sentiment in the foreign language, wherein the one or more terms are associated with one or more seed terms in one or more different languages; identifying, by a processor, a first term of the one or more terms associated with a seed term in a message; and based on the identification of the first term, determining that the message has a known sentiment.

An aspect of the above method includes further comprises: receiving a second message in the foreign language; identifying a seed term within the second message; analyzing the second message for a sentiment term in the foreign language; and storing the sentiment term.

An aspect of the above method further comprises determining statistical information about the sentiment term.

An aspect of the above method includes wherein the statistical information includes a confidence score that the sentiment term indicates a sentiment, and wherein the sentiment may be positive or negative.

An aspect of the above method includes wherein the confidence score is a probability, the method further comprises: determining if the confidence score reaches or crosses a predetermined threshold; and if the confidence score reaches or crosses the predetermined threshold, signifying that the sentiment term indicates a known sentiment.

An aspect of the above method further comprising: if the confidence score does not reach or cross the predetermined threshold, receiving a third message; re-calculating the confidence score using analysis associated with the third message.

An aspect of the above method includes wherein each seeding term includes two or more sentiment terms associated therewith.

An aspect of the above method includes wherein each message includes two or more seeding terms.

An aspect of the above method includes wherein at least one of the seeding terms is in English.

An aspect of the above method further comprises: analyzing a known negative/positive message; identifying seeding terms; and storing the seeding terms.

A computer readable medium having stored thereon processor executable instructions that cause a computing system to execute a method for generating an agent routing, the instructions comprising: instructions to receive a first message in the foreign language; instructions to identify a seed term within the first message, wherein the seed term is in a different language; instructions to analyze the first message for a sentiment term in the foreign language; instructions to store the sentiment term; instructions to retrieve the sentiment term with known sentiment in the foreign language; instructions to identify the sentiment term, associated with a seed term, in a second message; and based on the identification of the sentiment term, instructions to determine that the second message has a known sentiment.

An aspect of the above computer readable medium further comprises instructions to determine statistical information about the sentiment term, wherein the statistical information includes a confidence score that the sentiment term indicates a sentiment.

An aspect of the above computer readable medium further comprises: instructions to determine if the confidence score reaches or crosses a predetermined threshold; if the confidence score reaches or crosses the predetermined threshold, instructions to signify that the sentiment term indicates a known sentiment; if the confidence score does not reach or cross the predetermined threshold, instructions to receive a third message; and instructions to re-calculate the confidence score use analysis associated with the third message.

An aspect of the above computer readable medium includes wherein each seeding term includes two or more sentiment terms associated therewith.

An aspect of the above computer readable medium includes wherein each message includes two or more seeding terms, and wherein at least one of the seeding terms is in English.

A communication system comprising: a social media gateway in communication with a social media network, the social media gateway operable to receive a social media message, from a customer, on the social media network; a dialog system in communication with the social media gateway, the dialog system operable to determine an agent routing for the social media message, wherein the dialog system compromises: a text processing component that is operable to receive and analyze the social media message, wherein the text processing component compromises: a seed term identifier operable to: receive a first message in the foreign language; identify a seed term within the first message, wherein the seed term is in a different language; a negative term identifier in communication with the seed term identifier, wherein the negative term identifier is operable to analyze the first message for a sentiment term in the foreign language; a parser in communication with the negative term identifier, wherein the parser is operable store the sentiment term; a negative message identifier in communication with the parser, wherein the negative message identifier is operable to: retrieve the sentiment term with known sentiment in the foreign language; identify the sentiment term, associated with a seed term, in a second message; and based on the identification of the sentiment term, determine that the second message has a known sentiment.

An aspect of the above communication system further comprises a statistics analyzer in communication with the parser, wherein the statistics analyzer is operable to determine statistical information about the sentiment term, wherein the statistical information includes a confidence score that the sentiment term indicates a sentiment.

An aspect of the above communication system includes wherein the statistics analyzer is further operable to: determine if the confidence score reaches or crosses a predetermined threshold; if the confidence score reaches or crosses the predetermined threshold, signify that the sentiment term indicates a known sentiment; if the confidence score does not reach or cross the predetermined threshold, receive a third message; and instructions to re-calculate the confidence score use analysis associated with the third message.

An aspect of the above communication system includes wherein each seeding term includes two or more sentiment terms associated therewith.

An aspect of the above communication system includes wherein each message includes two or more seeding terms, and wherein at least one of the seeding terms is in English.

English is sometimes called the uniform language of anger sentiment. There are many ways that anger can be expressed in writing in English, and at least some of these methods are adopted across cultures. With the widespread use of social media, certain English phrases and expressions transcend language barriers. Examples might include "#fail," "Sucks", "<swear word>", "awesome", "best", #success", etc. These phrases or terms may be used across many languages.

Embodiments herein can derive sentiment from known words. Then, the system can identify English and/or other known language keywords from dialogs using text analysis and natural language processing. The system thereinafter can locate these words in messages and can create continuous derivatives.

For example, in the case of using the Japanese language to create a Korean sentiment dictionary, the system can monitor for similar co-occurrence, modeling, and keywords in each language. By watching polarity, seed words, and other distinctive features with a large number of occurrences, the system can provide word correlation between language sets. This correlation allows for significantly less translation and expense in creating a sentiment dictionary.

Another example might be when trying to expand sentiment to the French language, the system can use the hash tag "#fail" as a seeding term. The system then may monitor messages on social media for the "seed" term "#fail", when those messages are in French, and or some other appropriate query for the channel. The language identifier may additionally find posts in a targeted language with a simple query of "#fail." By accumulating a large volume of messages containing "#fail" in French, the system can use co-occur and other processing techniques to derive a common pattern of words in French posts with #fail. Since #fail is negative, these newly identified words in French from the posts can then be added to the French sentiment dictionary as negative terms. Once added, improved identification of French sentiment is possible on posts/comments without #fail. The system may then be used iteratively to expand language coverage and expand seed words for both positive and negative sentiment.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "seed term" can refer to a word, character, emoticon, punctuation, etc., or some combination thereof, in a first language that connotes sentiment in the first language. The seed term may connote a positive or negative sentiment. Further, the seed term may be universal in that the seed term may be used by people who do not speak or write the first language.

The term "sentiment term" can refer to a word, character, etc. in a native language that connotes sentiment in the native language. The sentiment term may connote a positive or negative sentiment.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the invention is considered to include a tangible storage medium and prior art-recognized equivalents and successor media, in which the software implementations of the present invention are stored.

The terms "determine", "calculate", and "compute," and variations thereof, as used herein, are used interchangeably and include any type of methodology, process, mathematical operation, or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects can be separately claimed.

The term "in communication with" as used herein refers to any coupling, connection, or interaction using electrical signals to exchange information or data, using any system, hardware, software, protocol, or format.

A user context, an extended user context, and/or a user social context as used herein means information about a user of a social media network that can be used to determine a "value" of that user.

The term "social media network" or "social media" is a service provider that builds online communities of people, who share interests and/or activities, or who are interested in exploring the interests and activities of others. Generally, social media are web-based and provide a variety of ways for users to interact, such as e-mail and instant messaging services.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. Various changes may be made in the function and arrangement of elements of the embodiment without departing from the spirit and scope of the appended claims.

Figure 1A:
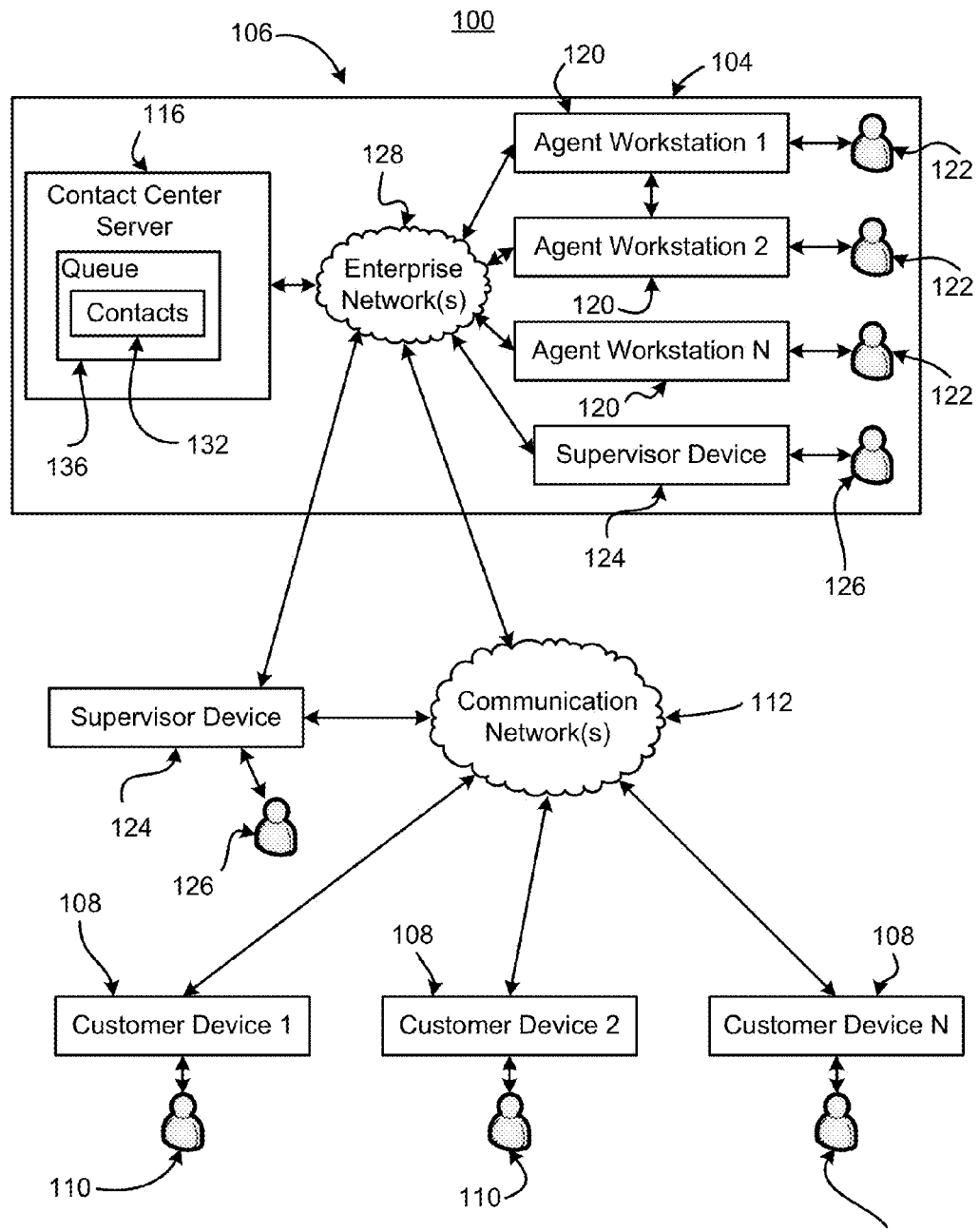
FIG. 1A is a block diagram of an embodiment of a communication system operable to interact with persons.

A block diagram depicting components of a communication system 100 is shown in FIG. 1A. In particular, the communication system 100 can include a contact center 104. In general, the contact center 104 can be in communication with one or more customer endpoints or devices 108 via one or more communication networks 112. Examples of customer endpoints 108 can include one or more of, but are not limited to, smartphones, desktop computers, laptop computers, or any other device capable of supporting communications between a customer and a customer service or other agent associated with the contact center 104 using written, oral, and/or electronic communications. Accordingly, communications between the contact center 104 and the customer endpoints 108 can comprise email, instant messaging, a telephone call, short message system, or other real time or non-real time communications. The communication network 112 can include the Internet, a local area network (LAN), wide area network (WAN), public switched telephone network (PSTN), wireless networks, or a plurality of networks in any combination.

The contact center 104 generally includes a call or contact center server 116, such as an automatic contact (or call) distribution system (ACD) server 116. The ACD server 116 is illustratively the Communication Manager™ enterprise communication-based ACD system available from Avaya Inc. The ACD server is interconnected to a plurality of agent workstations or endpoints 120. For example, the agent workstations 120 may be connected to the ACD server 116 by an enterprise network or networks 128.

The contact center server 116 generally functions to connect agent workstations 120 to customer devices or endpoints 108 through the communication network 112, to allow the agents 122 to service customer 110 contacts 132. The contacts can comprise written, electronic communications. However, contacts are not necessarily limited to written communications. For example, the contact center 106 can additionally handle voice contacts. As can be appreciated by one of skill in the art after consideration of the present disclosure, the contact center server 116 can maintain one or more queues 136 for organizing and maintaining or holding contacts 132 waiting for handling by a contact center agent 122. For example, a plurality of queues 136 can be provided to sort contacts according to various parameters. Agents 122 associated with the agent workstations 120 are assigned to provide services to contacts 132 that have been placed within one or more of the queues 136 based on availability and/or weighting factors. Moreover, the workstations 120, which can comprise general purpose computers, thin client devices, or other devices, generally support the delivery of customer contacts to associated agents 122, and to receive replies to the customer contacts from the agents 122. In addition, the agent workstations 120 can include a user output in the form of a display that can present a determined sentiment or sentiment indicator for a contact, or aggregation of contacts, to associated agents 122.

In addition, system 100, as described herein, can include one or more supervisor or administrator devices 124. The supervisor device 124 is generally in communication with the contact center server 116 via the communication network 112 and/or the enterprise network 128. For example, if the supervisor device 124 is on the premises of the contact center 104, communications with the contact center server 116 may be over a portion of the enterprise network 128 comprising a wired or wireless network. As another example, the supervisor device 124 may be in communication with the contact center server 116 over the communication network 112, for example via a cellular telephony data network, a wired or wireless connection outside of the enterprise network 128, or the like. In general, the supervisor device 124 comprises functionality that allows a supervisor 126 to monitor the health of the contact center 104, and to control aspects of the operation of the contact center 104. Moreover, the supervisor device 124 can present a sentiment indicator for a contact or aggregation of contacts to a supervisor 126. Accordingly, the supervisor device 124 can comprise any device, including a mobile device, capable of presenting information to a supervisor 126. Accordingly, examples of a supervisor device 124 include, but are not limited to, a tablet computer, a smartphone, a laptop computer, a desktop computer, a netbook, or the like.

Figure 1B:
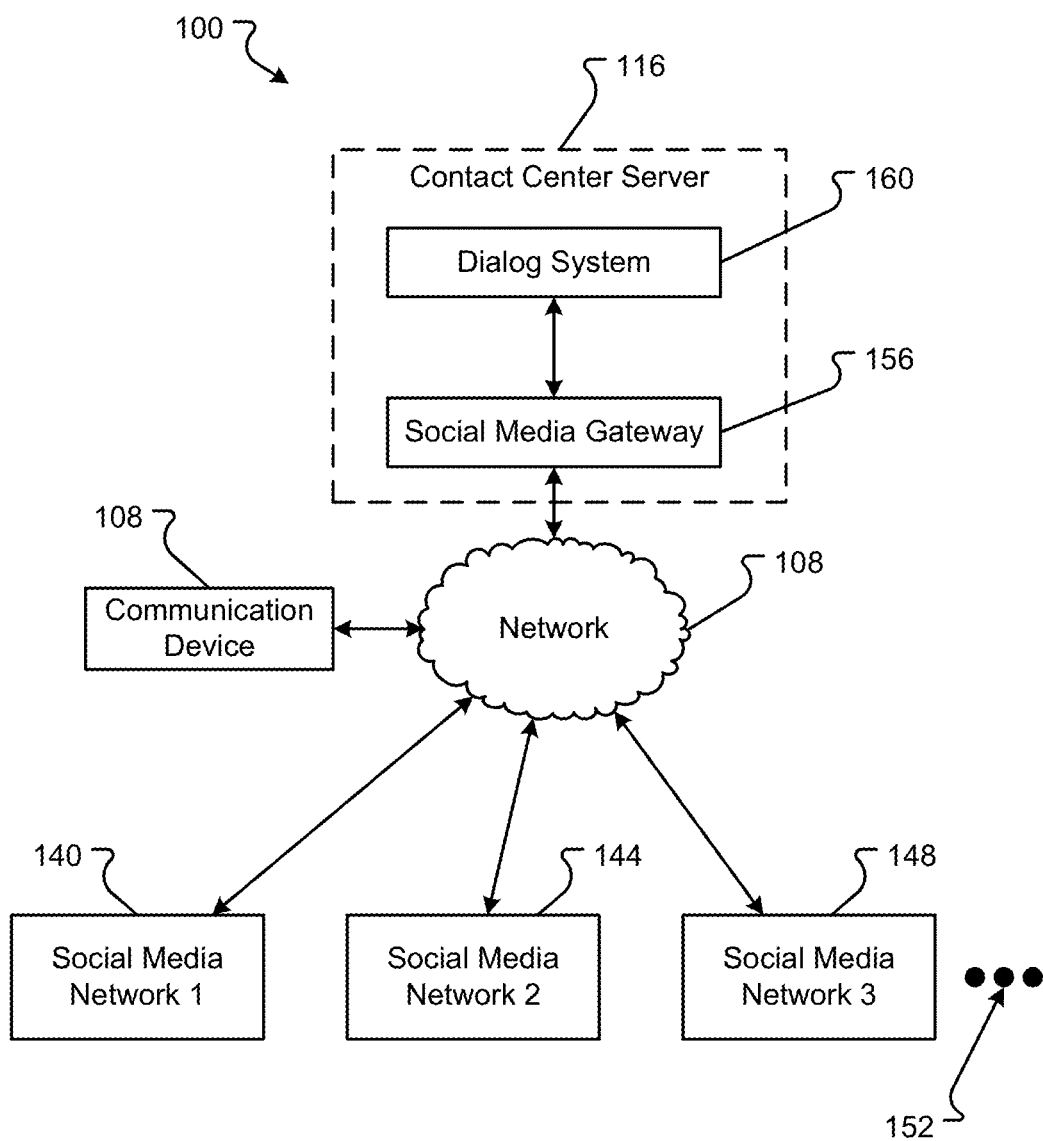
FIG. 1B is a block diagram of an embodiment of a communication system operable to interact with persons using a social media network.

A further embodiment of the communication system 100, for interacting with persons using social media, is shown in FIG. 1B. The communication system 100 can include a contact center 104, a network 128, 112, and one or more types of social media networks or systems, such as social media network 1 140, social media network 2 144, and/or social media network 3 148. Social media networks 140, 144, and/or 148 can be any social media including, but not limited to, networks, websites, or computer enabled systems. For example, a social media network may be MySpace™, Facebook™, Twitter™, Linked-In™, Spoke™, Sina Weibo, Pantip, or other similar computer enabled systems or websites. The communication system 100 can communicate with more or fewer social media networks 140, 144, and/or 148 than those shown FIG. 1B, as represented by ellipses 152.

The network(s) 128, 112 can be any network, as described in conjunction with FIG. 1A, which allow communication between the contact center 116 and the one or more social media networks 140, 144, and/or 148. The network(s) 128, 112 can represent any communication system, whether wired or wireless, using any protocol and/or format. The network(s) 128, 112 provides communication capability for the contact center 116 to communicate with websites or systems corresponding to the one or more social media networks 140, 144, and/or 148. The network(s) 128, 112 may be as described in conjunction with FIGS. 7 and 8.

A contact center 116 can be a system that can communicate with one or more persons that use social media networking sites 112, 114, and/or 116. The contact center 116 can be hardware, software, or a combination of hardware and software. The contact center 116 can be executed by one or more servers or computer systems, as described in conjunction with FIGS. 7 and 8. The contact center 116 can include all systems, whether hardware or software, that allow the contact center 116 to receive, service, and respond to directed and non-directed contacts. For example, the contact center 116 can include the telephone or email system, an interface to human agents, systems to allow human agents to service and respond to received contacts, and one or more systems operable to analyze and improve the function of agent interaction.

The contact center 116 may include a dialog system 160 and a social media gateway 156. While the dialog system 160 and the social media gateway 156 are shown as being a part of the contact center system 116, in other situations, the dialog system 160 and/or the social media gateway 156 are separate systems or functions executed separately from the contact center 116 and/or executed by a third party. The dialog system 160 may process and receive messages. The social media gateway 156 can receive and translate messages from the one or more social media networks 140, 144, and/or 148. An embodiment of the dialog system 160 is described in conjunction with FIG. 2B. An embodiment of the social media gateway 156 is described in conjunction with FIG. 2A.

The contact center 116 may also communicate with one or more communication devices 108. The communication devices 108 can represent a customer's or user's cell phone, email system, personal digital assistant, laptop computer, or other device that allows the contact center 116 to interact with the customer. The contact center 116 can modify a non-direct contact, from a social media network 140, 144, and/or 148, into a directed contact by sending a response message directly to a customer's communication device 108.

Figure 2A:
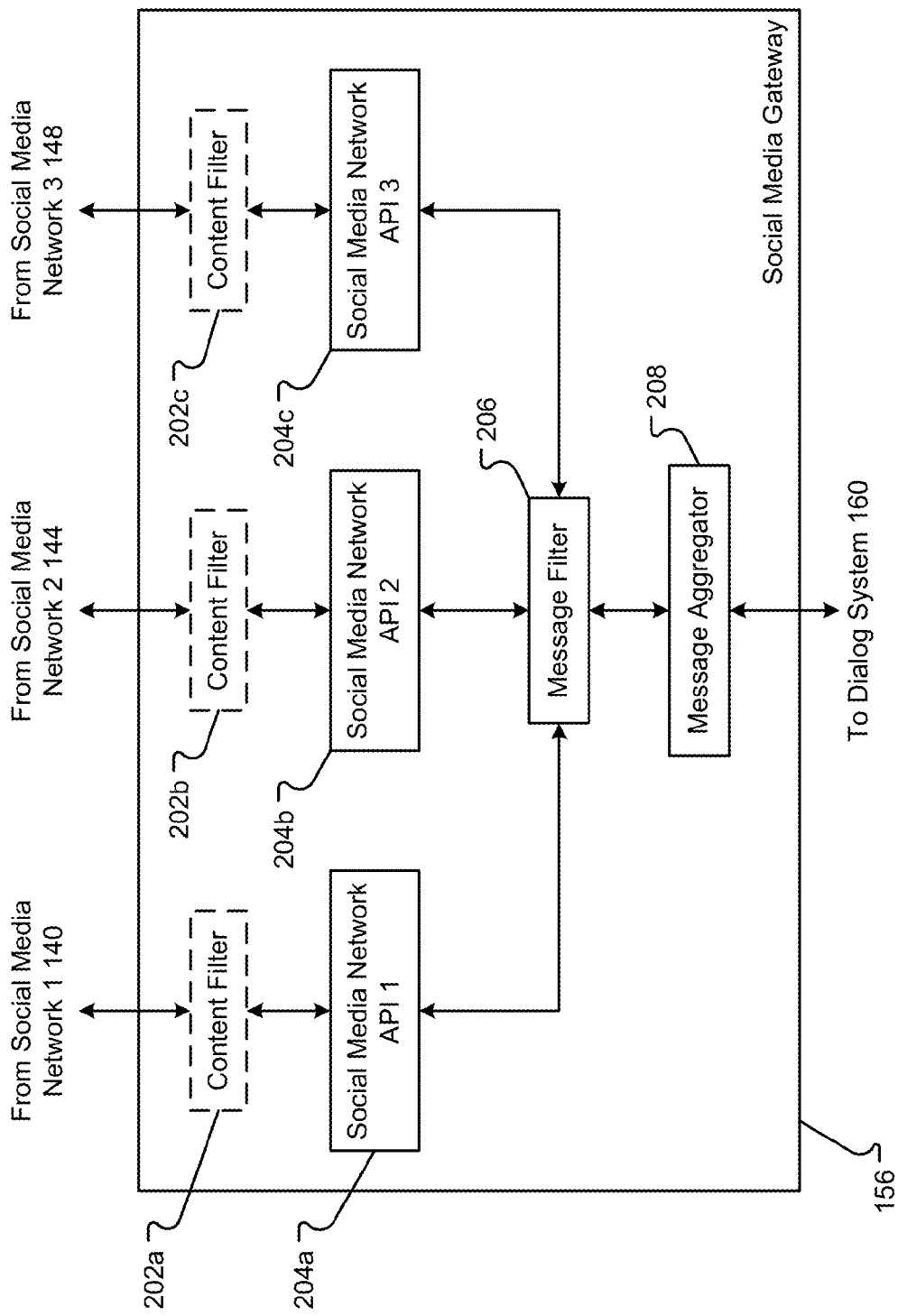
FIG. 2A is a block diagram of an embodiment of a social media gateway.

An embodiment of the social media gateway 156 is shown in FIG. 2A. The social media gateway 156 can include one or more components which may include hardware, software, or combination of hardware and software. The social media gateway 156 can be executed by a computer system, such as those described in conjunction with FIGS. 7 and 8. However, in other embodiments, the components described in conjunction with FIG. 2A are logic circuits or other specially-designed hardware that are embodied in a field programmable gate array (FPGA) application specific integrated circuit (ASIC), or other hardware.

Herein, the social media gateway 156 can include one or more content filters 202*a*, 202*b*, and/or 202*c*. A content filter 202 can receive all of the messages for the contact center 116 from a social media network 140, 144, and/or 148 and eliminate or delete those messages that do not require a response. For example, a message between two friends on a Facebook™ page, if not pertaining to a product or a service of the company operating the contact center 116, may not need a response. As such, the content filter 202 can filter out or delete the non-suitable message from the messages that are received by the social media network application programming interface (API) 1 204*a*, social media network API 2 204*b*, and/or social media network API 3 204*c*. With the content filter 202, the social media network API 204 only needs to convert to a common message format for those messages that should be received by the dialog system 160.

The content filter 202 is provided with one or more heuristics or filter rules from a filter database (not shown). These filter rules can be created by the external customer or internal user (e.g. agent or administrator) of the communication system 100. Thus, the user or customer of the communication system 100 can customize the filtering of messages from social media networks 140, 144, and/or 148. Further, different rules may be applied to different social media networks 140, 144, and/or 148, as some social media networks 140, 144, and/or 148 may have different types of messages or postings than other types of social media networks 140, 144, and/or 148. While the content filter 202 is shown as part of the social media gateway 156, it is to be appreciated that the content filter 202 may be a part of the social media network API 204. The content filter 202 may correspond to query terms used by the social media network API 204. The content filter 202 or query terms are an argument to the social media network API 204 call.

The social media network API 204 can be an application, which may be provided by the social media network 140, 144, and/or 148, to access the social media network(s) 140, 144, and/or 148. Thus, the social media network API 204 is called and connects the social media gateway 156 to the social media network 140, 144, and/or 148. Any suitable filter criteria may be employed for social media API 204. Examples of filter criteria include positive content of the source of a posting, an address field, a destination or recipient address fields, a time stamp field, a subject matter field, and/or a message body field. For example, a type of searchable content can be the name of the business enterprise running or employing the contact center 116 and/or the products or services of the enterprise.

The social media gateway 156 can include one or more social media network APIs 204. As shown in FIG. 2A, the social media gateway 156 may include a social media network API 204 for each social media network 140, 144, and/or 148. As such, the social media gateway 156 can interact with each social media network 140, 144, and/or 148 in the particular (often unique) format or protocol used by the social media network 140, 144, and/or 148. Further, when new social media networks are created, the social media gateway 156 can be easily expanded to interact with those social media networks by adding another social media network API 204. Where social media networks 140, 144, and/or 148 are more standardized, or use substantially similar formats or protocols, a single social media network API 204 can be shared by multiple social media networks 140, 144, and/or 148.

The social media network API 204 can receive messages from and send messages to the social media network 140, 144, and/or 148. The social media network API 204 can translate a message received from a social media network 140, 144, and/or 148 and send the translated message to a message filter 206. The social media network API 204 can translate the received message into a standard formatted file. For example, the translated message may be represented by an extensible mark-up language (XML) file or other file having a general format. As such, each specific and particular social media network message can be translated into a standard format for use by the dialog system 160. Further, the social media network API 204 can receive a generally or standard format response message, from the dialog system 160, and translate that response into a particularly or specifically formatted response message that can be posted to the corresponding social media network 140, 144, and/or 148.

Messages to the contact center 116 are addressed to the contact center 116. For example, a customer may become a "friend" of the contact center 116 on a social media network 140, 144, and/or 148, such as Facebook™. The customer may then address a message to the contact center 116 on Facebook™. This non-direct contact is a message that is not sent directly to the contact center 116 but to the contact center's Facebook™ page. In other circumstances, the contact center 116 receives messages not addressed to the contact center 116. For example, the contact center 116 can receive tweets from Twitter™ that are "broadcast" rather than addressed to the contact center 116. The contact center 116 may also search for messages or content on the social media networks 140, 144, and/or 148. Exemplary search criteria include customer name, customer profession, customer home address, customer business address, customer employer name, customer educational or professional background, customer hobby, personal or business interests, customer family profile, and the like. Thus, the social media gateway 156 of the contact center 116 can query, gather, or connect to a live feed of data from a social media network 140, 144, and/or 148 and then apply a filter to the indirect information.

Further, the social media network API 204 can also retrieve user context or other extended information from the social media networks 140, 144, and/or 148. User context or other extended information can include historical posts, historical tweets, or other historical communications that a user may have received or sent. Further, user context or other extended information can include, but is not limited to, account information for a user, the user's followers or friends, information on where historical messages were posted (e.g., geo-location, time/date, what type of device, etc.), trending analysis that the social media network 140, 144, and/or 148 might provide the user, etc. Thus, the social media network API 204 can retrieve information that is associated with a user and a social media network 140, 144, and/or 148 but not necessarily a part of a current message. The social media network API 204 is a gatherer of data, which can be used to determine a value for the user of the social media networks 140, 144, and/or 148.

The translated messages from the social media network API 204 can be received by a message filter 206. A message filter 206 can perform some or all of the functions of the content filter 202 and eliminate messages before being sent to the dialog system 160. However, in other situations, the message filter 206 eliminates information from within the messages before the redacted messages are sent to the dialog system 160. For example, a message from a social media network 140, 144, and/or 148 may have three or four interactions between two parties not associated with the contact center 116. Only one of the several postings may be pertinent to the dialog system 160. As such, the message filter 206 can eliminate or delete at least a portion of the other messages for the dialog system 160. Thus, the dialog system 160 receives a message where some of the content of the message has been deleted.

The message filter 206 can retrieve heuristics or filter rules from a filter database (not shown), similar to the content filter 202. A substantial difference between the content and message filters 202 and 206 is that the content filter 202 is specific to a particular message format associated with a corresponding social media network 140, 144, and/or 148, while the message filter 206 is applied to a standardized or universal format and is therefore common to multiple social media networks 140, 144, and/or 148. One skilled in the art will understand the type of rules that may be used to filter information from messages such that only pertinent questions, facts, requests, or information is sent to the dialog system 160.

A message aggregator 208 may also be included with the social media gateway 156. A message aggregator 208 can, in contrast to the message filter 206, combine two or more messages into a packet or grouping that is sent to the dialog system 160. Therefore, the message aggregator 208 can interrelate or combine messages based on information within the messages. For example, two messages may be combined based on any of the message fields referenced above, such as the person that posted the message, the subject, the request or question asked, the person the message was sent to, or other information that may be pertinent to the dialog system 160. Thus, the dialog system 160 may be able to respond concurrently to two or more messages based on a grouping provided by the message aggregator 208. Regardless of whether the messages are aggregated, each message or grouping of messages can be sent from the social media gateway 156 to the dialog system 160.

The social media gateway 156 can also send responses back to the social media networks 140, 144, and/or 148. A response from an agent in the contact center 116 can be sent to the social media gateway 156. The response may be received in a general format and then translated. The translated response may then be posted to the appropriate social media network 140, 144, and/or 148 by the social media gateway 156. In other embodiments, the agent may post the response directly to the social media network 140, 144, and/or 148 without sending the response to the social media gateway 156.

Figure 2B:
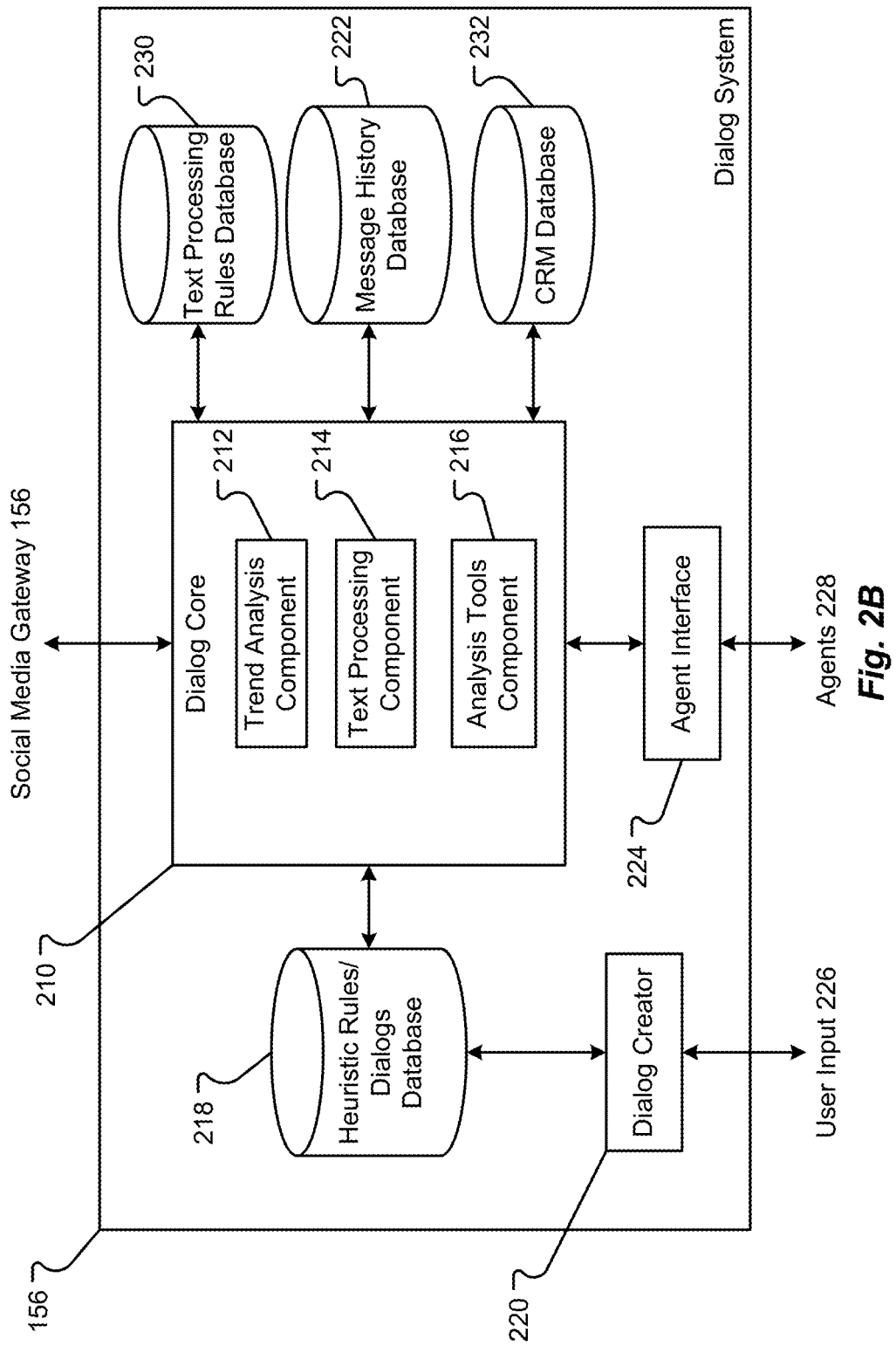
FIG. 2B is a block diagram of an embodiment of a dialog system.

An embodiment of the dialog system 160 is shown in FIG. 2B. The dialog system 160 can include one or more components which may be hardware, software, or a combination of hardware and software. The dialog system 160 can be executed by a computer system such as those described in conjunction with FIGS. 7 and 8. However, in other embodiments, the components described in conjunction with FIG. 2B, are logic circuits or other specially-designed hardware that are embodied in a FPGA or ASIC. The components contained within the dialog system 160 can include a dialog core 210 that is communication with a message history database 222, an agent interface 224, and a heuristic rules and dialogs database 218. Further, the heuristic rules and dialogs database 218 can be in communication with a dialog creator 220.

The dialog core 210 can include one or more subcomponents. For example, the dialog core 210 can include a trend analysis component 212, a text processing component 214, and an analysis tools component 216. These components, similar to the components for the dialog system 160, can be hardware, software, or combination of hardware and software. The dialog core 210 may step through the states of a dialog data structure. A dialog data structure can include a set of inputs and associated actions that can be taken which allow for the automatic and structured response to social media requests or messages. For example, if a user asks for a manual, the input of the text word "manual" can cause the dialog system 160, in accordance with a dialog data structure, to send information about one or more manuals. In turn, the receiver of the response may respond, in kind, with the selection of a certain user manual. In which case, the dialog data structure may then instruct the dialog core 210 to send the user to a website where the user can retrieve an electronic version of the manual. As such, the dialog data structure provides a script a dialog that allows the dialog core 210 to automate the interaction between the contact center 116 and a person. This automation eliminates the need for agent involvement, in some situations, and makes the contact center 116 more efficient and more effective. Further, the automation expands the contact center's ability to answer numerous messages from the plethora of postings on the numerous social media networks 140, 144, and/or 148.

The dialog creator 220 can create a dialog data structure that includes instructions for various states for each social media message that comes into the contact center 116. The first instruction might be to send the social media message to the trend analysis component 212, then to the text processing component 214, and then execute a query of a Customer Relationship Management (CRM) database 232 (to determine if this user has an existing order). A CRM database 232 can be a database as described in conjunction with FIGS. 7 and 8 and can store information about customers or other data related to customer relations. Finally, the dialog data structure 220 may decide that the social media message should be sent to a human agent 228 for processing. The instructions or node transitions are executed in the dialog core 210 and make use of many different components that the dialog creator 220 combines in any way the user desires to handle the social media messages. The dialog core 210 can make use of the trend analysis component 212, text processing component 214, or other systems. The dialog core 210 may also interface with a CRM system and/or database 232, external databases, social media user information (e.g., followers, friends, post history, etc. from the social media site), or other systems.

The trend analysis component 212 is operable to analyze trends that occur between two or more messages received by the social media networks 140, 144, and/or 148. The two messages can be from different social media network 140, 144, and/or 148, so that the trend analysis component 212 can identify trends across several different social media networks 140, 144, and/or 148. Trends can include multiple occurrences of the same word or phrase, multiple occurrences of a customer identity, product name or service, or multiple occurrences of some other information that might indicate a trend. Further, the trend analysis component 212 may be able to identify escalations in the occurrences of particular text, identities, or other information, or may identify multiple occurrences over a period of time. The trend analysis component 212 may also be able to apply one or more different algorithms to occurrences of information within the social media networks 140, 144, and/or 148. For example, the trend analysis component 212 can match the number of occurrences of a phrase or word over a period of time and apply analysis to determine if the occurrences are increasing or decreasing over the period of time.

The text processing component 214 is operable to analyze text of one or more messages from social media networks 112, 114, or 116 or other contacts. Some possible methods for text processing can include Regular Expression, Latent Semantic Indexing (LSI), text part of speech tagging, text clustering, N-Gram document analysis, etc. In addition, for possibly longer documents, (such as, blogs or emails), the text processing component 214 may execute one or more methods of document summarization. The summarization may occur if the social media message will be sent to an agent 228 of the contact center 116; the summarization can reduce the amount of information that the agent 228 may manage. The text processing rules or models may be stored in and/or retrieved from a text processing rules database 230. The text processing rules database 230 can be a database as described in conjunction with FIGS. 7 and 8 that stores rules or models used by the text processing component 214.

The text processing component 214 can identify one or more occurrences of a particular text, such as using one or more of the message fields referenced above, in order to associate that social media message with one or more dialogs data structures in the heuristic rules and dialog database 218. For example, the text processing component 214 can look for the word "manual," in the social media message. If the word "manual" is found, the text processing component 214 may retrieve a dialog data structure from the heuristic rules and dialogs database 218 and, as the dialog data structure instructs, communicate with the customer about one or more owner's manuals, repair manuals, or other types of manuals. In another example, if the social media message includes the words, "buy", "sell", "price, "discount" or other types of words that may indicate the user or customer wishes to buy a product, the text processing component 214 can retrieve one or more dialog data structures from the heuristic rules and dialogs database 218 that can provide instruction to assist the customer in purchasing products or services from the enterprise.

The analysis tools component 216 is operable to analyze response messages received back from an agent interface 224. In analyzing the agent's responses, the analysis tools component 216 can determine if the dialog data structures originally retrieved by the text processing component 214 met the needs of the customer. In the analysis, the agent 228 may enter one or more items of information, for the analysis tools component 216, about the response and about how the response matched with the dialog data structures. The analysis tools component 216 can review the response and determine if it was similar to the response provided by the dialog data structure. Thus, the analysis tools component 216 can provide information to the dialog core 210 or the dialog creator 220 to improve the dialog data structures that are included in the heuristic rules and dialogs database 218.

Figure 7:
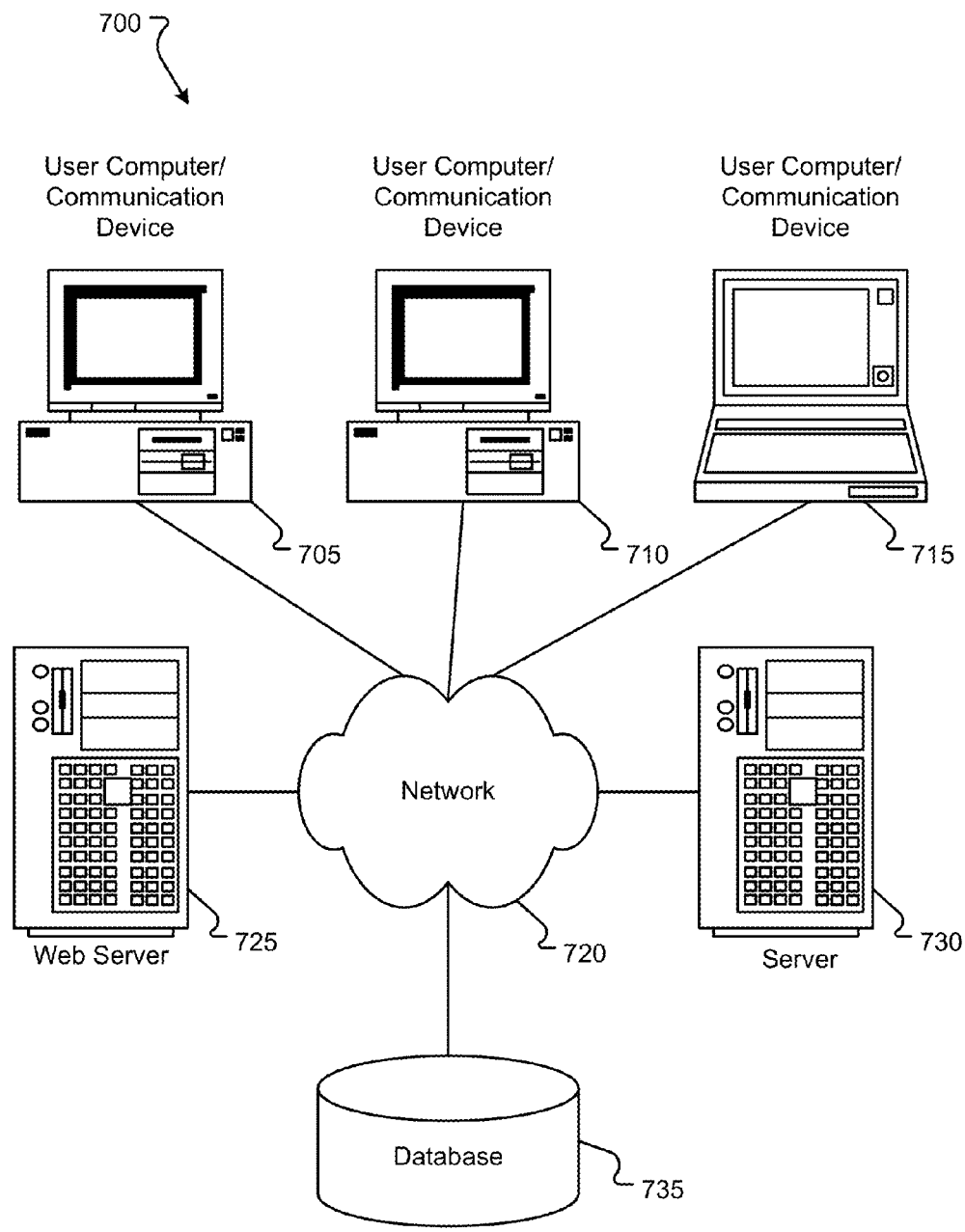
FIG. 7 is a block diagram of an embodiment of a computing environment.
Figure 8:
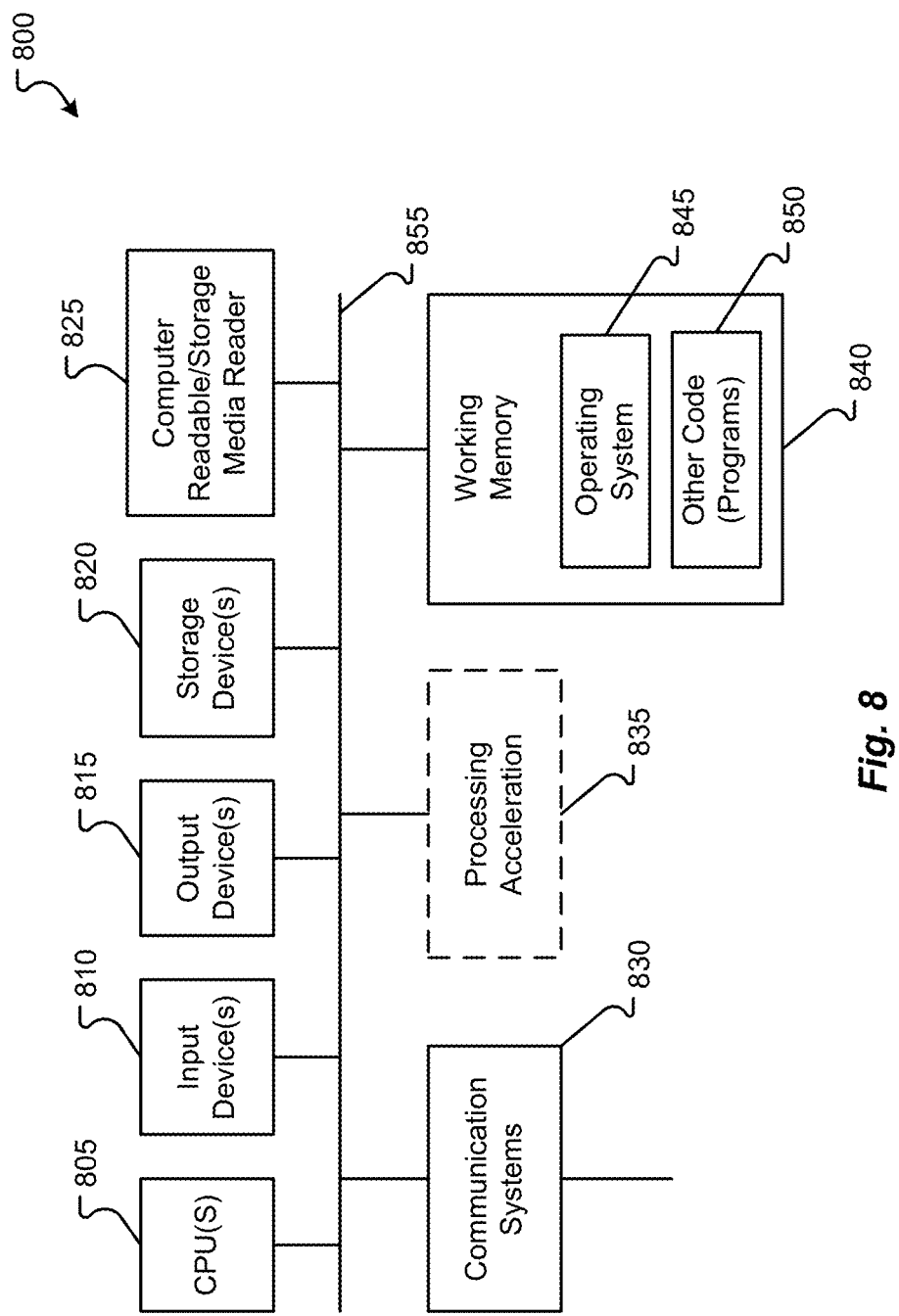
FIG. 8 is a block diagram of an embodiment of a computer system.

The message history database 222 can be any database or data storage system as described in conjunction with FIGS. 7 and 8. Thus, the message history database 222 can store data in data fields, objects, or other data structures to allow other systems to retrieve that information at a later time. The message history database 222 can store previous messages or information about previous messages. Thus, for example, if the trend analysis component 212 is analyzing several messages over a period of time, the trend analysis component 212 can retrieve information about previous messages associated with the current analysis from the message history database 222. As such, the trend analysis component 212 can better detect trends occurring at the social media networks 140, 144, and/or 148. The data stored by the message history database 222 can include the entire message or only a portion of the message, and in some circumstances, include metadata about the message(s).

The heuristic rules and dialogs database 218 can be any type of database or data storage system as described in conjunction with FIGS. 7 and 8. The heuristic rules and dialogs database 218 can store information in data fields, data objects, and/or any other data structures. The heuristic rules and dialogs database 218 stores rules and dialogs data structures that automate responses to received social media messages. The dialogs data structures control the interaction between the dialog core 210 and the social media network 140, 144, and/or 148. The dialogs or heuristic rules can be created by a dialog creator 220. Thus, the dialog creator 220 can interface with user input 226 to receive information about dialogs. The user input 226 is then used to form the states and responses for a dialog data structure.

An agent interface 224 is a communication system operable to send action items to contact center agents 228, in the contact center 116. An agent can be a person or other system that is operable to respond to certain questions or requests from a customer. For example, the agent 228 can be a person that has specialized expertise in a topic area, such as technical support. The agent interface 224 can format the social message into an action item and forward that message to one or more agents 228. The agent interface 224 can also receive response(s) back from the agents 228. The information provided by the agent 228 may be used by the dialog core 210 to complete a response to the social media message or other contact. For example, the information may classify the social media message (e.g., sales, service, etc.). In other situations, the response is a complete response to the social media message that can be posted to the social media network 140, 144, and/or 148. It should be noted that the answer based agent routing described hereinafter may be implemented in other types of call center or customer service centers other than that previously described. Thus, the answer based agent routing systems and methods described hereinafter are not limited to the social media call center described above.

Figure 3:
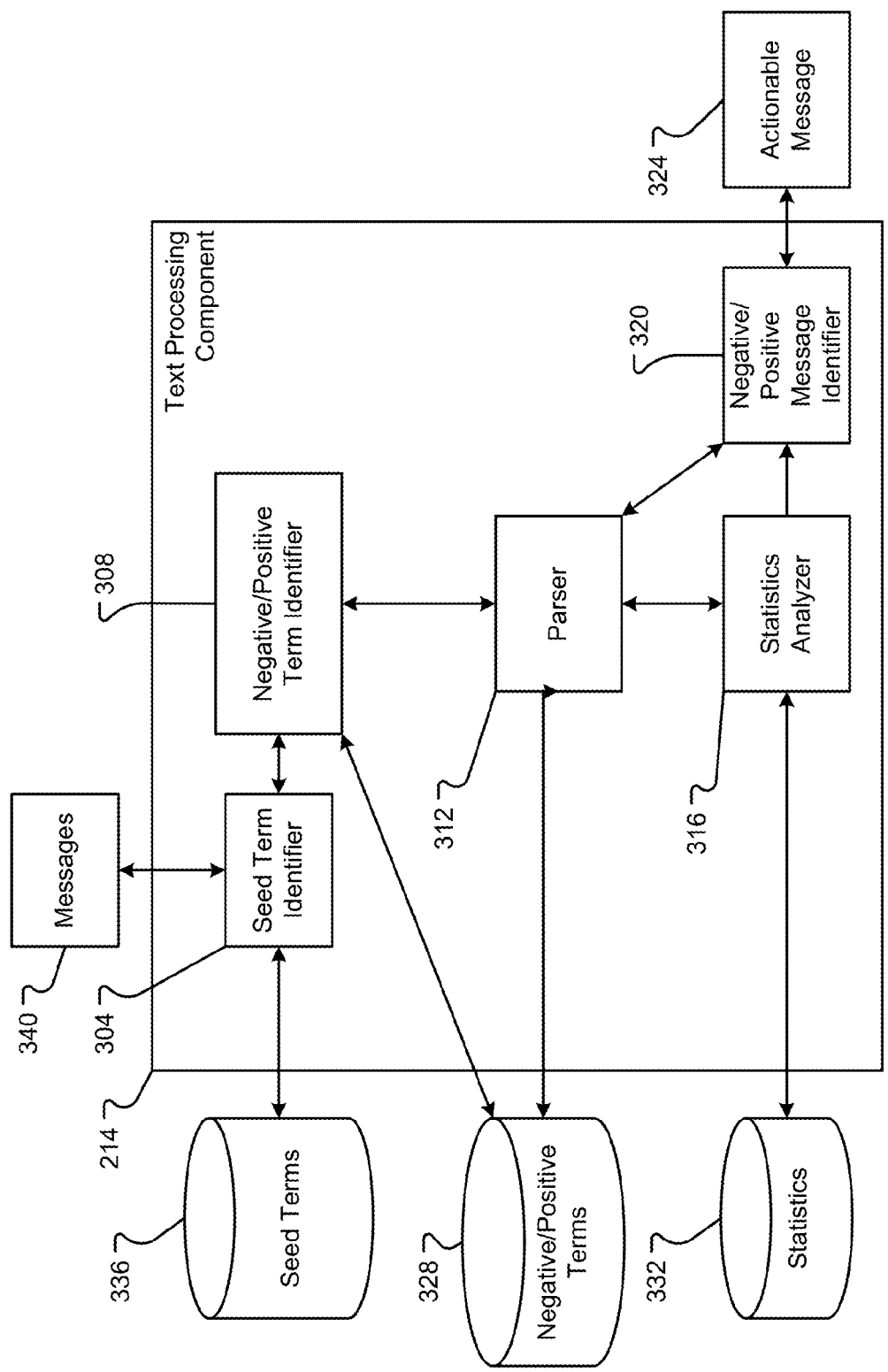
FIG. 3 is a block diagram of an embodiment of an text processing component.

An embodiment of a text processing component 214 is shown in FIG. 3. As explained previously, the text processing component 214 can be a module that is embodied in hardware, software, and/or hardware and software. The text processing component 214 can include one or more sub-modules or components. These components may provide certain functionality and be able to access one or more databases. The databases can include a seed terms database 336, a negative/positive terms database 328, and a statistics database 332. These databases may be flat file databases, relational databases, or any other type of database used to store, retrieve and manage information or data. The seed terms database 336 can include one or more seed terms described herein. The negative/positive terms database 328 can include the one or more negative/positive terms in the foreign language, as described herein. The statistics database 332 can include the statistics about the negative/positive terms, including any confidence score, confidence interval, and/or probability that the negative/positive term stored in the negative/positive terms database 328 can connote negative/positive sentiment in the foreign language.

A seed term identifier 304 can receive one or messages. The seed term identifier 304 can then evaluate the message(s) to locate any of the seed terms, retrieved from seed terms database 336, in the message 304. If any seed terms are identified, the seed terms may be identified and/or indicated in the message 304, and then sent to the negative/positive term identifier 308.

The seed term identifier 304 may also receive the selection of seed terms to be stored in a seed terms database 336. Here, a user, supervisor or some other person may enter a seed term input into the seed term identifier 304 to indicate which seed term(s) should be used. For example, the seed term identifier 304 can receive a selection to use the "#fail" identifier as a seed term. Further, other English words may be used, such as, "sucks", "awesome", "cool", "#success", or some other term or curse term that may be used globally as a sign of negativity.

Further, the seed term identifier 304 may receive messages 304 with known negative/positive content in a foreign language and be able to receive inputs as to which terms within those messages 304 are negative/positive. Here, the seed term identifier 304 may evaluate two or more messages 304 to determine which of the foreign language seed terms may have a greater confidence score or likelihood of being used thereinafter. These seed terms, whether provided or identified, are stored in the seed terms database 336, for use in the future for identifying other negative/positive terms in a foreign language that may be associated with, or correlated with, the seed terms. Messages with seed terms identified are passed to the negative/positive term identifier 308.

The negative/positive term identifier 308 is operable to store negative/positive terms in database 328. The database 328 can provide negative/positive terms that are associated with the foreign language. Here, the negative/positive term identifier 308 can receive a message having one or more seed terms identified. The seed terms may then be used to locate other terms in the foreign language within the message that may be correlated with the seed term. There may be a physical proximity or term density within the message that indicates to the negative/positive term identifier 308 that these identified terms are negative/positive terms in the foreign language and may connote negative/positive sentiment because of their relation or associated to the seed term. These negative/positive terms may then be stored in the negative/positive terms database 328. The message with the negative/positive terms identified may be passed to the parser 312.

The parser 312 may extract possible negative/positive terms from the message and store those negative/positive terms in the negative/positive terms database 328. Here, the parser 312 may be able to extract negative/positive terms and store those negative/positive terms, and may also provide other information in the negative/positive terms database 328. For example, the parser 312 may provide a number of instances, some type of correlation between the negative/positive term and seed term, or other information in the negative/positive terms database 328. The negative/positive term information may also be passed from the parser 312 to the statistics analyzer 316.

The statistics analyzer 316 is operable to review instances of a negative/positive term being used within a message. The analysis information is stored in the statistics database 332. Here, the statistics analyzer 316 can attempt to determine, by multiple instances of a negative/positive term being identified in a message with the seed term, whether that negative/positive term has a statistical confidence score of connoting negative/positive sentiment within a message. The statistics analyzer 316 can use known statistical techniques to determine a confidence score, which can include a confidence score, that a negative/positive term having consistent and continuous use with a seed term and/or within a negative/positive message may indeed connote negative/positive sentiment. Upon reaching some threshold, for example, the confidence interval of 90%, the statistics analyzer 316 may then provide that negative/positive term to a negative/positive message identifier 320 to use in evaluating future messages.

A negative/positive message identifier 320 may receive the message 304, negative/positive terms from the parser 312, and/or information about the statistics associated with the negative/positive terms from statistics analyzer 316. With this information, a negative/positive message identifier 320 can locate the negative/positive terms within a message 304 and determine if the message likely has a negative/positive sentiment. If the message does have negative/positive sentiment, that message may be actionable. The actionable message, therefore, may then be sent onto an agent interface 224 to be routed to an agent 228. It is at this time that the message can be translated, or the message may be sent to an agent having a fluency in that language. Thus, using the system of FIG. 3, only messages that are believed to have negative/positive sentiment can be addressed or provided to agents. This process thus eliminates a great number of messages in foreign languages that need not be translated.

Figure 4:
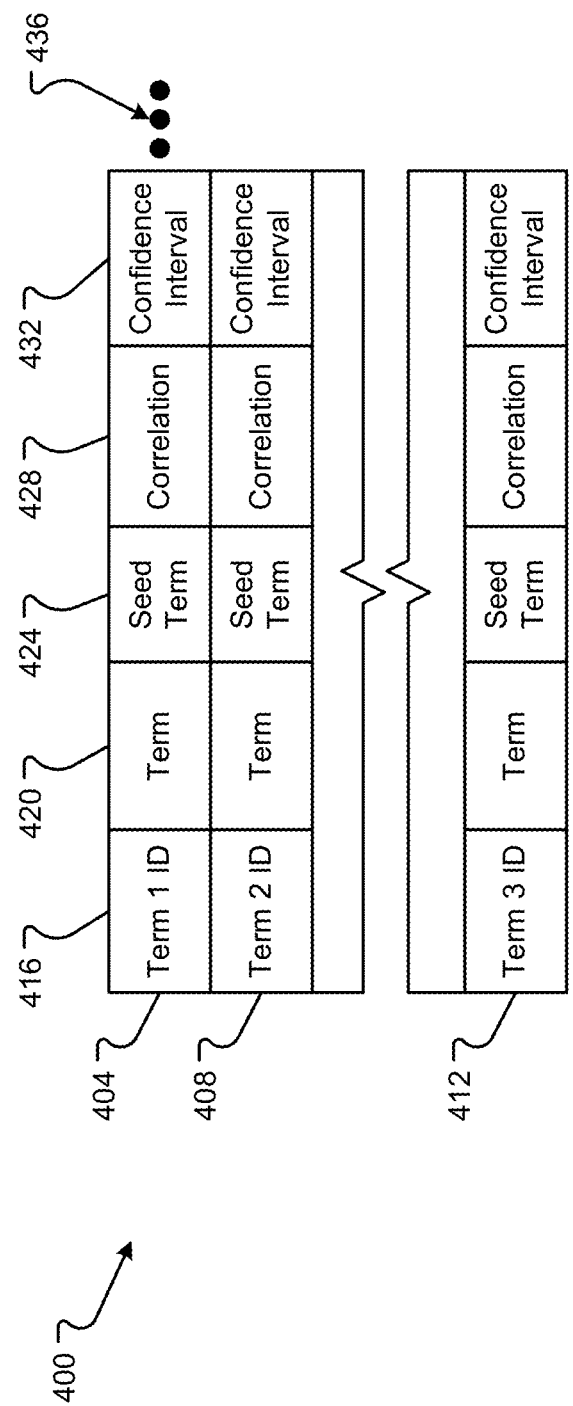
FIG. 4 is a block diagram of an embodiment a data structure or database for storing seed terms, associated terms in one or more foreign languages, and/or statistics pertaining thereto.

A database 400 for storing negative/positive terms, which may be the same or similar to negative/positive terms database 328, along with any information about statistics 332 or seed terms in database 236, may be shown in FIG. 4. Here, the information in these separate databases 328 through 336 are shown as being consolidated into one data structure 400, but may be stored in separate database. The data structure 400 can include one or more rows 404, 408, 412, which may each be associated with a negative/positive term. Each row may include different fields or portions that are associated with the negative/positive term. For example, the fields can include one or more of, but are not limited to, a term identifier 416, the negative/positive term 420, the seed term 424, a correlation statistics 428, and/or a confidence interval 432. The rows 404-412, within the data structure 400, can include more or fewer fields than those shown in FIG. 4, as represented by ellipses 436. Further, there may be more or fewer rows 404 through 412 than those shown in FIG. 4.

The term identifier 416 can be any type of identifier that provides a way of identifying the negative/positive term. The term identifier 416 can be an alphanumeric identifier, a globally unique identifier (GUID), or some other identifier that uniquely identifies the negative/positive term amongst other negative/positive terms within the database 400. The term identifier 416 may be used because some negative/positive terms may be picture-based (e.g., Chinese characters). Thus, these types of terms are more difficult to locate and store and may require using a term identifier 416.

The negative/positive term may be provided in field 420. Here, the negative/positive term 420 is listed with any characters or pictures required to identify or provide that negative/positive term 420. The term identifier field of 416 and the term field 420 may be searched to locate the term to update statistics in fields 428 and/or 432.

One or more seed terms may be listed in field 424 that have been associated with negative/positive term 420. Thus, each negative/positive term 420 may have been associated with, located near, or identified because of one or more seed terms 424. In this way, every time the negative/positive term 420 is discovered, the seed term used to identify the negative/positive term may be listed in field 424. The more seed terms listed in field 424 connotes a higher confidence score that term 420 is negative/positive.

A correlation field 428 can provide some type of score that quantifies the possibility that the negative/positive term 420 and the seed term, or at least one of the seed terms in field 424, are correlated. The correlation may be a number based on the number of instances the negative/positive term has been found with the seed term, the type of physical proximity between seed term and the negative/positive term, or other information. The correlation field 428 can store the highest correlation, store an average correlation, or may store both a highest and average correlation for one or more of the seed terms 424.

The confidence interval 432 may be a statistical confidence interval that the negative/positive term 420 does connote negative/positive sentiment. The confidence interval 432 may be created over several instances or several messages that include the term 420. Thus, as the term 420 becomes more prevalent in messages with the seed terms 424 and is consistently found with the seed term 424, the confidence interval rises. The confidence interval 432, thus, suggests a probability that a negative/positive term 420 is, or connotes, negative/positive sentiment in a foreign language.

Figure 5:
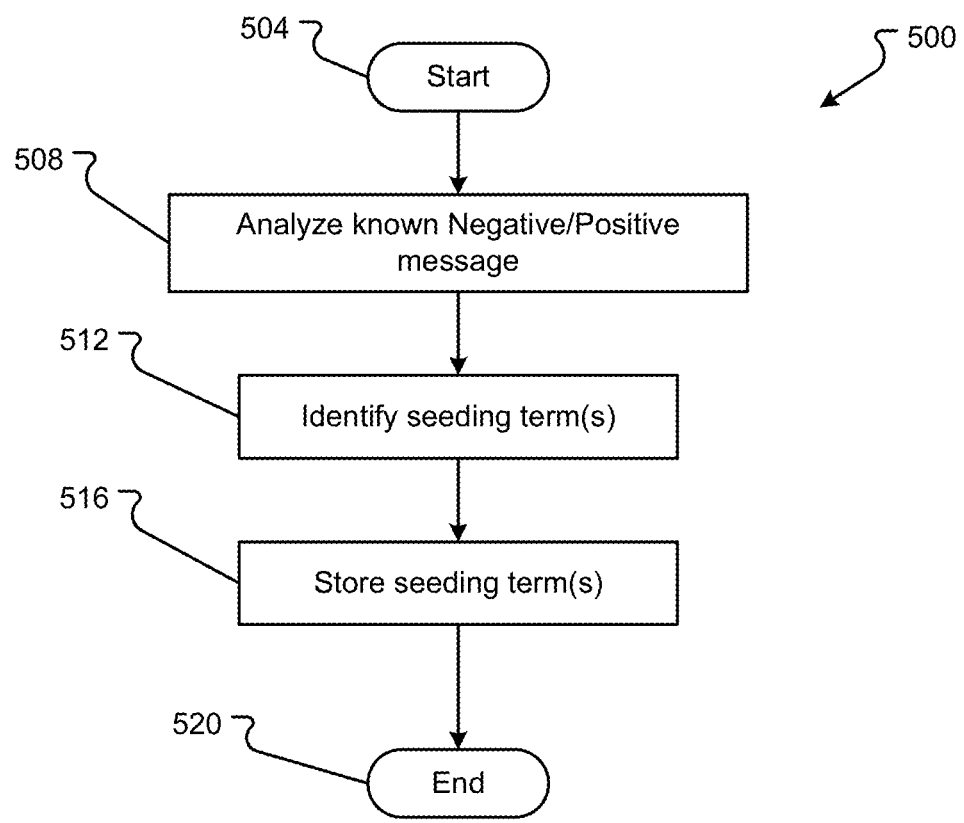
FIG. 5 is a flow diagram of an embodiment a process for identifying seed terms.

An embodiment of a method 500 for determining seeding terms is shown in FIG. 5. Generally, the method 500 begins with a start operation 504 and terminates with an end operation 520. While a general order for the steps of the method 500 are shown in FIG. 5, the method 500 can include more or fewer steps or arrange the order of the steps differently than those shown in FIG. 5. The method 500 can be executed as a set of computer-executable instructions, executed by a computer system, and encoded or stored on a computer readable medium. Further, the method 500 can be executed by a gate or other hardware device or component in an Application Specific Integrated Circuit, a Field Programmable Gate Array, or other type of hardware device. Hereinafter, the method 500 shall be explained with reference to the systems, components, modules, software, data structures, user interfaces, etc. described herein.

The seed term identifier 304 can analyze known negative/positive messages 304, in step 508. Thus, the seed term identifier 304 can be provided with two or more messages that have known negative/positive sentiment. From these messages, the seed term identifier 304 can locate reoccurrences of certain terms within that language that may be used as a seed term.

The seed term identifier 304 then identifies the seeding terms, in step 512. The identification can be through language or text processing algorithms. As more messages 304 are provided to the seed term identifier 304, the seed term identifier 304 can better identify probable seeding terms, in step 512.

The seed term identifier 304 may then store the seeding terms, in step 516. Here, the seed term identifier 304 parses or extracts the seeding terms, and stores those seeding terms in the seed terms database 336. These seed terms in database 336 may then be used thereinafter for analyzing other messages.

Figure 6:
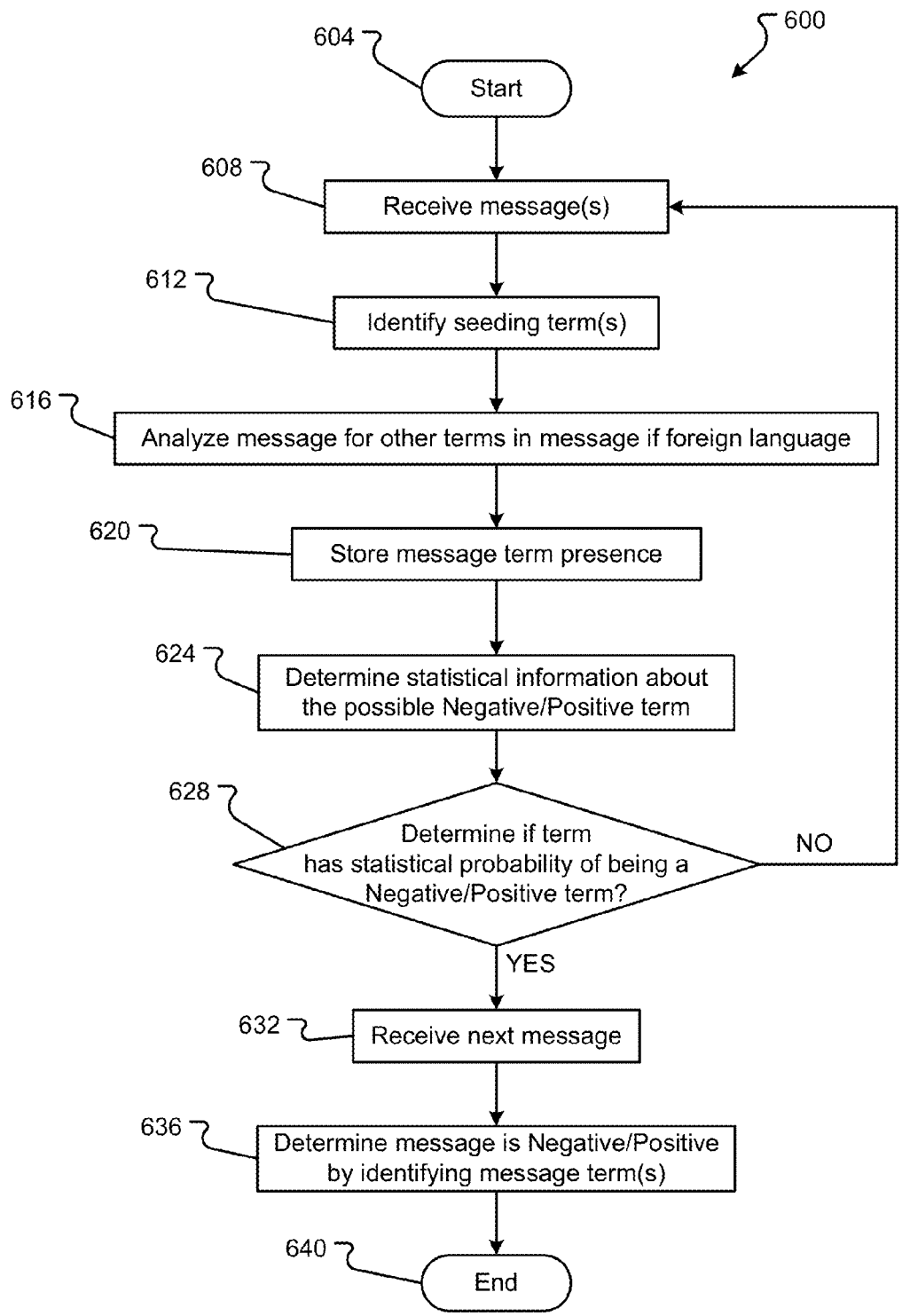
FIG. 6 is a flow diagram of an embodiment a process for identifying terms in a foreign language associated with a seed term.

An embodiment of a method 600 for identifying negative/positive sentiment in a message of a different language or foreign language is shown in FIG. 6. Generally, the method 600 begins with a start operation 604 and terminates with an end operation 640. While a general order for the steps of the method 600 are shown in FIG. 6, the method 600 can include more or fewer steps or arrange the order of the steps differently than those shown in FIG. 6. The method 600 can be executed as a set of computer-executable instructions, executed by a computer system, and encoded or stored on a computer readable medium. Further, the method 600 can be executed by a gate or other hardware device or component in an Application Specific Integrated Circuit, a Field Programmable Gate Array, or other type of hardware device. Hereinafter, the method 600 shall be explained with reference to the systems, components, modules, software, data structures, user interfaces, etc. described herein.

The contact center server 116 can receive messages, in step 608. The contact center server 116 can receive a message from a customer device 108, through a communications network 112, which is sent through an enterprise network 128 to a contact center server 116. In other situations, the contact center server 116 may receive a social media message through a social media gateway 156. The messages may then be provided to the dialog core 210. Specifically, the text processing component 214 of the dialog core 210 can receive the messages.

A seeding term identifier 304 may then receive the messages 340. The seeding term identifier 304 may then retrieve one or more seeding terms from seed terms database 336. The seeding terms can then be used to review messages 340 to determine or identify seeding terms within the messages 340, in step 612. Here, the seeding term identifier 304 does a scan or compare between the seed terms and the message 340. Any located seeding terms are then flagged, indicated, or identified, and the message 340 may be passed to the negative/positive term identifier 308.

The negative/positive term identifier 308 can then analyze the message for other terms in the message in the foreign language. A negative/positive term identifier 308 can analyze the foreign language message for these other terms, in step 616, to determine which terms may have negative/positive sentiment. Here, the negative/positive term identifier 308 attempts to find terms that have had previous appearances in previous messages, or terms that have some type of correlation with the seed term. These terms can be correlated with the seeding terms based on physical proximity, rate of occurrence, or some other information. Any term within the message 340 that appears to be negative/positive may be passed to the parser 312.

The parser 312 can extract the negative/positive terms from the message 340 and store those message terms or sentiment terms in a negative/positive terms database 328, in step 620. The information in the database 328 continues to be updated as negative/positive terms are identified, or instances of negative/positive terms are identified, and any information about negative/positive terms in a message may be passed to statistics analyzer 316.

The statistics analyzer 316 can then determine statistical information about the possible negative/positive term, in step 624. Here, the statistics analyzer 316 can compute a correlation 428 and/or a confidence interval 432 for each of the sentiment terms identified in the foreign language. The statistics may be continuously updated as new messages are received and possible new or recurrent instances of a negative/positive term(s) is used. At some point thereinafter, the statistics analyzer 316 can determine if a term has a statistical confidence score of being a negative/positive term, in step 628. Here, if the negative/positive term reaches a predetermined threshold, for example, a confidence interval of 90%, the statistics analyzer 316 then denotes that the negative/positive sentiment term can be used to indicate negative/positive sentiment within a foreign language. If the term does have a statistical confidence score of being a negative/positive term, the method 600 proceeds YES to step 632. If the term does not have a statistical confidence score of being a negative/positive term at present time, the method 600 proceeds NO to receive more messages in step 608 and further analyze that term.

In step 632, a next message is received. This next message may be provided to the negative/positive message identifier 320. The negative/positive message identifier 320 can receive a list of negative/positive terms from the parser 312 with any associated statistical information from the statistics analyzer 316. The negative/positive terms may then be compared against the newly received message 340 to determine if the negative/positive term(s) exists within the message. If the negative/positive terms do appear within the message, and if the instances appear to be in a great enough concentration, the negative/positive message identifier 320 can determine that the message is negative/positive or has negative/positive sentiment, in step 636. The message with negative/positive sentiment may then be sent, as an actionable message 324, to agent interface 324 to be routed to an agent 228.

It should be noted that each seeding term may include two or more sentiment terms associated therewith. Thus, in database 400, the seeding terms 424 may be listed in two or more rows 404 through 412. Further, in some circumstances, each message received 340 may include two or more seeding terms. More seeding terms within a message indicates that there is a higher confidence score that the message 340 is negative/positive. Further, the accumulation of seeding terms in a message may bolster the possibility of finding negative/positive terms or creating a better association between seeding terms and negative/positive terms. The seeding terms 304 can be in English, as English tends to be cross-cultural, and English is used internationally to represent anger and/or dissatisfaction.

The ability to locate seeding terms and then identify sentiment terms with negative/positive connotations in a foreign language helps to better evaluate incoming messages 340. The advantage with such a processing system 100 is that not every message 340 received by the contact center server 116 needs to be translated. Determining whether messages that are identified as having negative/positive sentiment, based on the presence of sentiment terms with negative/positive connotation, need to be translated helps to greatly reduce the effort needed for the contact center 116 to review messages in certain foreign languages. Further, a database of sentiment terms 328 may be built automatically through the reception of several messages and over a period of time. Still further, as these negative/positive terms are identified and have higher and higher statistical confidence score of connoting negative/positive content, those negative/positive terms 328 may be then become seed terms for other languages. This database, with its growing number of terms, may then be able to indicate, over a period of time, negativity in any type of language received by the contact center server 116. This process, thus, provides the great advantage to analyze messages, without needing to have specific people who are fluent in those languages read or translate the messages.

FIG. 7 illustrates a block diagram of a computing environment 700 that may function as servers, computers, or other systems provided herein. The environment 700 includes one or more user computers 705, 710, and 715. The user computers 705, 710, and 715 may be general purpose personal computers (including, merely by way of example, personal computers, and/or laptop computers running various versions of Microsoft Corp.'s Windows™ and/or Apple Corp.'s Macintosh™ operating systems) and/or workstation computers running any of a variety of commercially-available UNIX™ or UNIX-like operating systems. These user computers 705, 710, 715 may also have any of a variety of applications, including for example, database client and/or server applications, and web browser applications. Alternatively, the user computers 705, 710, and 715 may be any other electronic device, such as a thin-client computer, Internet-enabled mobile telephone, and/or personal digital assistant, capable of communicating via a network 720 and/or displaying and navigating web pages or other types of electronic documents. Although the exemplary computer environment 700 is shown with three user computers, any number of user computers may be supported.

Environment 700 further includes a network 720. The network 720 may can be any type of network familiar to those skilled in the art that can support data communications using any of a variety of commercially-available protocols, including without limitation SIP, TCP/IP, SNA, IPX, AppleTalk, and the like. Merely by way of example, the network 720 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 702.11 suite of protocols, the Bluetooth™ protocol known in the art, and/or any other wireless protocol); and/or any combination of these and/or other networks.

The system may also include one or more server 725, 730. In this example, server 725 is shown as a web server and server 730 is shown as an application server. The web server 725, which may be used to process requests for web pages or other electronic documents from user computers 705, 710, and 715. The web server 725 can be running an operating system including any of those discussed above, as well as any commercially-available server operating systems. The web server 725 can also run a variety of server applications, including SIP servers, HTTP servers, FTP servers, CGI servers, database servers, Java servers, and the like. In some instances, the web server 725 may publish operations available operations as one or more web services.

The environment 700 may also include one or more file and or/application servers 730, which can, in addition to an operating system, include one or more applications accessible by a client running on one or more of the user computers 705, 710, 715. The server(s) 730 and/or 725 may be one or more general purpose computers capable of executing programs or scripts in response to the user computers 705, 710 and 715. As one example, the server 730, 725 may execute one or more web applications. The web application may be implemented as one or more scripts or programs written in any programming language, such as Java™, C, C#™, or C++, and/or any scripting language, such as Perl, Python, or TCL, as well as combinations of any programming/scripting languages. The application server(s) 730 may also include database servers, including without limitation those commercially available from Oracle, Microsoft, Sybase™, IBM™ and the like, which can process requests from database clients running on a user computer 705.

The web pages created by the server 725 and/or 730 may be forwarded to a user computer 705 via a web (file) server 725, 730. Similarly, the web server 725 may be able to receive web page requests, web services invocations, and/or input data from a user computer 705 and can forward the web page requests and/or input data to the web (application) server 730. In further embodiments, the web server 730 may function as a file server. Although for ease of description, FIG. 6 illustrates a separate web server 725 and file/application server 730, those skilled in the art will recognize that the functions described with respect to servers 725, 730 may be performed by a single server and/or a plurality of specialized servers, depending on implementation-specific needs and parameters. The computer systems 705, 710, and 715, web (file) server 725 and/or web (application) server 730 may function as the system, devices, or components described in FIGS. 1-4.

The environment 700 may also include a database 735. The database 735 may reside in a variety of locations. By way of example, database 735 may reside on a storage medium local to (and/or resident in) one or more of the computers 705, 710, 715, 725, 730. Alternatively, it may be remote from any or all of the computers 705, 710, 715, 725, 730, and in communication (e.g., via the network 720) with one or more of these. The database 735 may reside in a storage-area network ("SAN") familiar to those skilled in the art. Similarly, any necessary files for performing the functions attributed to the computers 705, 710, 715, 725, 730 may be stored locally on the respective computer and/or remotely, as appropriate. The database 735 may be a relational database, such as Oracle 10i™, that is adapted to store, update, and retrieve data in response to SQL-formatted commands.

FIG. 8 illustrates one embodiment of a computer system 800 upon which the servers, computers, or other systems or components described herein may be deployed or executed. The computer system 800 is shown comprising hardware elements that may be electrically coupled via a bus 855. The hardware elements may include one or more central processing units (CPUs) 805; one or more input devices 810 (e.g., a mouse, a keyboard, etc.); and one or more output devices 815 (e.g., a display device, a printer, etc.). The computer system 800 may also include one or more storage devices 820. By way of example, storage device(s) 820 may be disk drives, optical storage devices, solid-state storage devices such as a random access memory ("RAM") and/or a read-only memory ("ROM"), which can be programmable, flash-updateable and/or the like.

The computer system 800 may additionally include a computer-readable storage media reader 825; a communications system 830 (e.g., a modem, a network card (wireless or wired), an infra-red communication device, etc.); and working memory 840, which may include RAM and ROM devices as described above. The computer system 800 may also include a processing acceleration unit 835, which can include a DSP, a special-purpose processor, and/or the like.

The computer-readable storage media reader 825 can further be connected to a computer-readable storage medium, together (and, optionally, in combination with storage device(s) 820) comprehensively representing remote, local, fixed, and/or removable storage devices plus storage media for temporarily and/or more permanently containing computer-readable information. The communications system 830 may permit data to be exchanged with the network 820 (FIG. 8) and/or any other computer described above with respect to the computer system 800. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 800 may also comprise software elements, shown as being currently located within a working memory 840, including an operating system 845 and/or other code 850. It should be appreciated that alternate embodiments of a computer system 800 may have numerous variations from that described above. For example, customized hardware might also be used and/or particular elements might be implemented in hardware, software (including portable software, such as applets), or both. Further, connection to other computing devices such as network input/output devices may be employed.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments have been described in detail herein, it is to be understood that the inventive concepts may be otherwise variously embodied and employed, and that the appended claims are intended to be construed to include such variations, except as limited by the prior art.

What is claimed is:

1. A communication system comprising:
   a social media gateway in communication with a social media network, the social media gateway operable to receive a social media message, from a customer, on the social media network;
   a dialog system in communication with the social media gateway, the dialog system operable to determine an agent routing for the social media message, wherein the dialog system compromises:
   a text processing component that is operable to receive and analyze the social media message, wherein the text processing component compromises:
   a seed term identifier operable to:
      receive a first message in a foreign language; and
      identify a seed term within the first message, wherein the seed term is in a different language;
   a negative/positive term identifier in communication with the seed term identifier, wherein the negative/positive term identifier is operable to analyze the first message for a sentiment term in the foreign language;
   a parser in communication with the negative/positive term identifier, wherein the parser is operable to store the sentiment term; and
   the negative/positive message identifier in communication with the parser, wherein the negative/positive message identifier is operable to:
      retrieve the sentiment term with known sentiment in the foreign language;
      identify the sentiment term, associated with the seed term, in a second message; and
      based on the identification of the sentiment term, determine that the second message has a known sentiment.

2. The communication system as defined in claim 1, further comprising a statistics analyzer in communication with the parser, wherein the statistics analyzer is operable to determine statistical information about the sentiment term, wherein the statistical information includes a confidence score that the sentiment term indicates a sentiment.

3. The communication system as defined in claim 2, wherein the statistics analyzer is further operable to:
  determine if the confidence score reaches or crosses a predetermined threshold;
  if the confidence score reaches or crosses the predetermined threshold, signify that the sentiment term indicates the known sentiment;
  if the confidence score does not reach or cross the predetermined threshold, receive a third message; and
  instructions to re-calculate the confidence score using analysis associated with the third message.

4. The communication system as defined in claim 3, wherein each seeding term includes two or more sentiment terms associated therewith.

5. The communication system as defined in claim 4, wherein each message includes two or more seeding terms, and wherein at least one of the seeding terms is in English.

6. A method for determining sentiment in a foreign language, the method comprising:
  receiving a social media message, with a social media gateway in communication with a social media network, from a customer on the social media network;
  determining an agent routing for the social media message, with a dialog system in communication with the social media gateway;
  receiving and analyzing the social media message with a text processing component of the dialog system, the text processing component comprising a seed term identifier;
  receiving, with the seed term identifier, a first message in a foreign language;
  identifying, with the seed term identifier, a seed term within the first message, wherein the seed term is in a different language;
  analyzing, with a negative/positive term identifier in communication with the seed term identifier, the first message for a sentiment term in the foreign language;
  storing, with a parser in communication with the negative/positive term identifier, the sentiment term;
  retrieving, with the negative/positive message identifier in communication with the parser, the sentiment term with known sentiment in the foreign language;
  identifying, with the negative/positive message identifier in communication with the parser, the sentiment term, associated with the seed term, in a second message; and
  based on the identification of the sentiment term, determining, with the negative/positive message identifier in communication with the parser, that the second message has a known sentiment.

7. The method as defined in claim 6, further comprising: determining statistical information about the sentiment term.

8. The method as defined in claim 7, wherein the statistical information includes a confidence score that the sentiment term indicates a sentiment, and wherein the sentiment may be positive or negative.

9. The method as defined in claim 8, wherein the confidence score is a probability, the method further comprising:
  determining if the confidence score reaches or crosses a predetermined threshold; and
  if the confidence score reaches or crosses the predetermined threshold, signifying that the sentiment term indicates the known sentiment.

10. The method as defined in claim 9, further comprising:
  if the confidence score does not reach or cross the predetermined threshold, receiving a third message;
  re-calculating the confidence score using analysis associated with the third message.

11. The method as defined in claim 10, wherein each seeding term includes two or more sentiment terms associated therewith.

12. The method as defined in claim 11, wherein each message includes two or more seeding terms.

13. The method as defined in claim 12, wherein at least one of the seeding terms is in English.

14. The method as defined in claim 13, further comprising:
  analyzing a known negative/positive message;
  identifying seeding terms; and
  storing the seeding terms.

15. A non-transitory computer readable medium having stored thereon processor executable instructions that cause a computing system to execute a method for generating an agent routing, the instructions comprising:
  instructions to receive a social media message, with a social media gateway in communication with a social media network, from a customer on the social media network;
  instructions to determine an agent routing for the social media message, with a dialog system in communication with the social media gateway;
  instructions to receive and analyze the social media message with a text processing component of the dialog system, the text processing component comprising a seed term identifier;
  instructions to receive, with the seed term identifier, a first message in a foreign language;
  instructions to identify, with the seed term identifier, a seed term within the first message, wherein the seed term is in a different language;
  instructions to analyze, with a negative/positive term identifier in communication with the seed term identifier, the first message for a sentiment term in the foreign language;
  instructions to store, with a parser in communication with the negative/positive term identifier, the sentiment term;
  instructions to retrieve, with the negative/positive message identifier in communication with the parser, the sentiment term with known sentiment in the foreign language;
  instructions to identify, with the negative/positive message identifier in communication with the parser, the sentiment term, associated with the seed term, in a second message; and
  instructions to, based on the identification of the sentiment term, determine, with the negative/positive message identifier in communication with the parser, that the second message has a known sentiment.

16. The computer readable medium as defined in claim 15, further comprising instructions to determine statistical information about the sentiment term, wherein the statistical information includes a confidence score that the sentiment term indicates a sentiment.

17. The computer readable medium as defined in claim 16, further comprising:
  instructions to determine if the confidence score reaches or crosses a predetermined threshold; and
  if the confidence score reaches or crosses the predetermined threshold, instructions to signify that the sentiment term indicates the known sentiment.

18. The computer readable medium as defined in claim 17, further comprising:
   if the confidence score does not reach or cross the predetermined threshold, instructions to receive a third message; and
   instructions to re-calculate the confidence score using analysis associated with the third message.

19. The computer readable medium as defined in claim 17, wherein each seeding term includes two or more sentiment terms associated therewith.

20. The computer readable medium as defined in claim 19, wherein each message includes two or more seeding terms, and wherein at least one of the seeding terms is in English.

\* \* \* \* \*